(Model.)
J. W. BULGER.
SELF SEALING JAR.
No. 409,169. Patented Aug. 20, 1889.
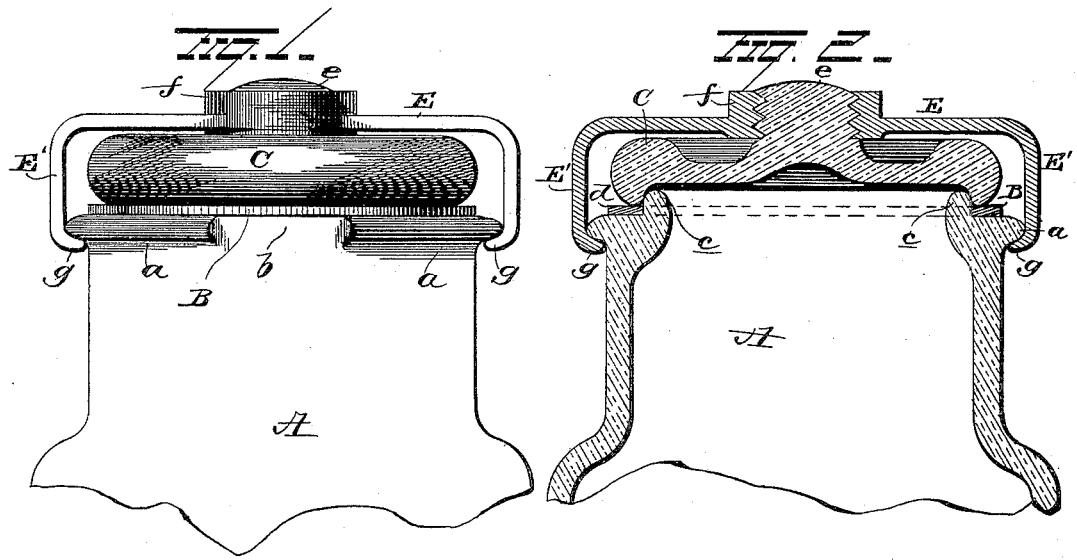
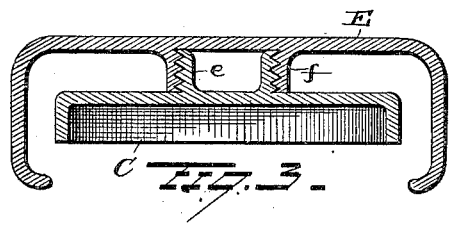
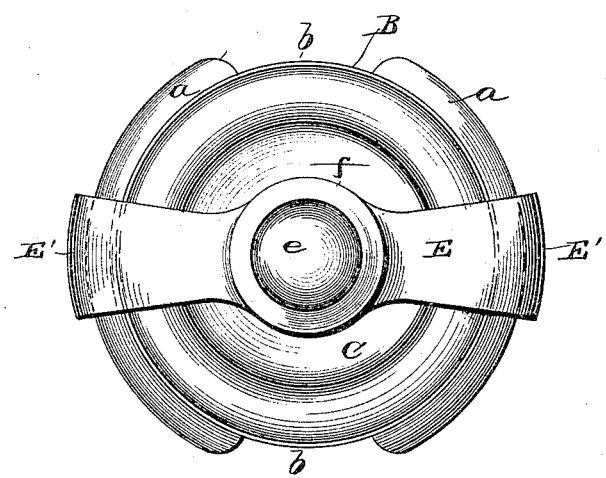
Witnesses
E. F. Nottingham
G. F. Downing
Inventor
John W Bulger
By his Attorneys
Leggett & Leggett

UNITED STATES PATENT OFFICE.

JOHN W. BULGER, OF EAST LIVERPOOL, OHIO.

SELF-SEALING JAR.

SPECIFICATION forming part of Letters Patent No. 409,169, dated August 20, 1889.

Application filed October 3, 1888. Serial No. 287,105. (Model.)

*To all whom it may concern:*

Be it known that I, JOHN W. BULGER, a resident of East Liverpool, in the county of Columbiana and State of Ohio, have invented certain new and useful Improvements in Self-Sealing Jars for the Preservation of Fruit and other Articles; and I do hereby declare the following to be a full, clear, and exact description of the invention, such as will enable others skilled in the art to which it appertains to make and use the same.

My invention relates to an improvement in packing and storing vessels, and more particularly to self-sealing jars for the preservation of fruit or other materials.

The object of my invention is to produce a simple and reliable device for the secure adjustment of a lid or cover upon a fruit-jar or similar vessel.

To this end my invention consists in certain features of construction and combinations of parts, that will be hereinafter described, and pointed out in the claim.

Referring to the drawings, Figure 1 is a side elevation in perspective of the upper portion of a jar with the lid and securing device in position on the lid and in contact with the jar. Fig. 2 is an elevation in section of the upper portion of a fruit-jar, showing the clamping device in contact with a lid and the jar. Fig. 3 is a modified form of the bail-clamp, shown in position on a jar-neck, the parts being in sectional elevation. Fig. 4 is a plan view of the device.

A is the upper portion of a jar. Near the top edge on its neck there are two laterally-projected ribs $a$, between which the spaces $b$ intervene. On the top surface of the jar-neck a projecting annular shoulder $c$ is formed, that is adapted to retain in place the packing-ring B.

The lid or cover C is preferably made of glass and is so shown in Figs. 1 and 2. It is provided with a depending flange $d$, that surrounds its edge to loosely embrace the edge of the jar-neck above the ribs $a$, the flat lower face of the lid resting on the packing-ring when both are in position. The upper surface of the lid C has a depression made in it that surrounds a threaded nipple $e$, which is made integral with the lid. Said nipple or cylindrical boss extends vertically a proper height from the center of the cover to engage the nut $f$, that is formed on or affixed to the upper surface of the bail-clamp E, as shown in Fig. 2. This bail-clamp is made of metal, preferably cast into form, with the threaded nut $f$ located midway between its depending limbs E', which limbs are provided with inwardly-extended lips or flanges $g$, that are in such proper relative position with regard to the ribs $a$ when the limbs of the clamp are inserted between the ends of the ribs or through the spaces $b$ that the lips $g$ will hook under the ribs if the bail-clamp is partially revolved on the boss $e$, thus drawing the lid forcibly upon the gum washer B.

From the above it will be seen that by holding the lid against movement and rotating the bail, or holding the bail and rotating the lid, the bail by its contact with the threaded boss $e$ is elevated until its lips $g$ come in contact with the ribs $a$ and lock the lid or cover solidly on the packing-ring.

The feature of adjustment for pressure of the lid on the jar is of great value, as it affords a range to compensate for any difference in thickness of the lid or gum washer, or the position of the ribs with regard to the length of the limbs of the bail-clamp, thus overcoming difficulties and defects incidental to many plans of sealing jars now in use, and affording a simple, cheap, and more reliable as well as practical device for the purpose.

If desired, the lid of a jar may be made of metal instead of glass and the valuable features of my present invention combined therewith in an obvious manner.

In Fig. 3 there is shown a modified form of the bail-clamp E, in which the nut is reversed and depends from the center of the clamp instead of projecting above it. The operation is identical; but the plan of construction shown in Figs. 1 and 2 is preferred as affording a more compact arrangement of parts.

In my device the nut $f$ is of a size sufficient to cover the screw-threaded boss and protect the latter from fracture or injury.

Having fully described my invention, what I claim as new, and desire to secure by Letters Patent, is—

The combination, with a jar having horizontal beads at its upper end arranged to provide intervening spaces for the insertion of bail-clamps and a lid or cover having a screw-threaded boss integral therewith, of a bail-clamp constructed with inwardly-projecting lips to engage the beads and provided with a screw-threaded nut substantially equal in length to the length of the boss on the lid and furnished with a series of female screw-threads that engage the male threads of the boss, substantially as set forth.

In testimony whereof I have signed this specification in the presence of two subscribing witnesses.

JOHN W. BULGER.

Witnesses:
P. KERNAN,
JOHN RINEHART.